| United States Patent [19] | [11] Patent Number: 4,950,433 |
| Chiu | [45] Date of Patent: Aug. 21, 1990 |

[54] METHOD OF SPRAY DRYING PHENOL-FORMALDEHYDE RESIN COMPOSITIONS

[75] Inventor: Shui-Tung Chiu, Coquitlam, Canada

[73] Assignee: Borden, Inc., Columbus, Ohio

[21] Appl. No.: 385,571

[22] Filed: Jul. 26, 1989

[51] Int. Cl.$^5$ .......................... B29B 9/10; C08G 8/10; C08G 14/04

[52] U.S. Cl. ........................................... 264/13; 264/5

[58] Field of Search ..................................... 264/13, 5

[56] References Cited

U.S. PATENT DOCUMENTS 4,324,747  4/1982  Sudan et al. ........................... 264/13

Primary Examiner—Sam Silverberg
Assistant Examiner—Mary Lynn Fertig
Attorney, Agent, or Firm—K. P. Van Wyck; D. H. Rainear; G. P. Maskas

[57] ABSTRACT

A pre-cure resistant powder resin binder for waferboard/oriented strandboard manufacture is manufactured from spray drying a liquid resin composition containing a low advanced phenol-formaldehyde resin and a water soluble oxo compound of boron. The spray dryability of the low molecular weight phenol-formaldehyde resin is enhanced by the addition of the oxo boron compound.

12 Claims, No Drawings

METHOD OF SPRAY DRYING PHENOL-FORMALDEHYDE RESIN COMPOSITIONS

BACKGROUND OF THE INVENTION

This invention relates to the formulation and manufacture of a spray dry resole type phenol-aldehyde resin containing water soluble oxo compounds of boron. The powdered resin has pre-cure resistant property and finds particular utility for making composition boards such as that of waferboard and oriented strandboard (OSB) manufacture.

At present, most Canadian waferboards and oriented strandboards are manufactured with powdered phenol-formaldehyde resins. The powdered resins have a number of advantages over liquid resins, such as: (a) simple and less expensive equipment can be used for powder resin delivery and blending with wood furnish; (b) powdered resins are easy to blend onto wood wafers and strands, achieving uniform resin distribution; and (c) powdered resins have long storage lives.

In industrial practice, resins with different properties are applied separately onto face and core furnish of waferboard/oriented strandboard. The face resin blended wood furnish is used for face layers, and the cored resin blended wood furnish is for core layer construction of waferboard/oriented strandboard. The face resin requires pre-cure resistance, non-sticking to platen and light color after cure. The core resin requires the ability to cure fast. The two resin (face and core) system has the advantages of producing high quality board and increasing mill productivity by reducing hot pressing times.

In earlier industrial practice, novolac type phenol-formaldehyde powder resins were used for waferboard/oriented strandboard manufacture. The novolac resins have excellent pre-cure resistant properties due to excellent thermal flow under heat and pressure, and they also have a light color on the wood board surface after curling. However, the novolac resins have the disadvantages of sticking on caul plate and platen surfaces and being of considerably higher cost to manufacture than spray dried resole resins.

For waferboard/oriented strandboard manufacture, the spray dried resole resins require a property of pre-cure resistance for face layer applications. To have the pre-cure property, the powder resin must have a significantly longer thermal flow property under heat and pressure than that of the core resin. The thermal flow property is mainly controlled by the molecular weight of the resin. Low molecular weight resins show higher thermal flow property and better pre-cure resistance than high molecular weight resin. However, spray drying a resole resin having the desired pre-cure resistance is difficult due to poor spray dryability of the low moleuclar weight resin.

In the spray drying process, a liquid phenol-aldehyde resin is atomized to fine droplets and mixed with hot air (180° to 210° C.) to evaporate the water from the resin droplets. The temperature of the resin is usually close to the boiling water temperature or higher. After evaporation of water, the low molecular weight phenol-aldehyde resin particles are soft and tacky. The low softening particles tend to deposit on the surfaces of the spray dryer chamber and cyclone. The undesired deposit of resin is severely detrimental to the spray drying operation by reducing powder resin yield, increasing fire hazard, frequently shutting down operation for cleaning, and undesirably increasing powder particle size. Therefore, the spray drying of low molecular weight resole has the problems of low powder resin yield, high cost of production, low spray dryer productivity, and the production of inferior products.

DESCRIPTION OF THE PRIOR ART

Spray drying phenol-aldehyde resins is a known technology. U.S. Pat. No. 4,098,770 (Berchem et al) described that spray dried powder resin was prepared by spray drying a highly-advanced resole. The patent also suggested that a non-phenolic polyhydroxy compound may be mixed with the liquid resin before spray drying. The non-phenolic polyhydroxy compounds were propylene glycol, butylene glycol, and ethylene glycol, which are plasticizers for powdered resins. However the patent suggested neither to spray dry a low molecular weight phenol-aldehyde resin nor a solution to the problems of spray drying the resin.

U.S. Pat. No. 4,424,300 (Udvardy et al) indicated that a powdered resin composition was made by spray drying a homogeneous liquid resin mixture which contained a novolac resin and a resole resin. The novolac and resole resins were made by conventional methods. The resins were mixed before spray drying. This patent states that the powder resin had a faster cure property than novolac resin and better thermal flow property than residue powder resin.

Boric acid is known to be a catalyst for making high ortho-linkage novolac resins. After compounding with hexamethylenetetramine, the boric acid catalyzed resin cured faster than the conventional acids catalyzed novolac resins.

Furthermore, boric acid and borax were suggested as fire retardant agents for phenol-formaldehyde resin foam and phenolic plastic laminations.

U.S. Pat. No. 3,298,973 (Quarles et al) indicated that a fire resistant phenol-formaldehyde resin foam was made by catalyzing a mixture of resole resin and foaming agent with boric acid and an organic acid. Chemical Abstract: CA88(6):38604 (Ger. Offen. DE 2717775) showed that borax was used in phenol-formaldehyde resin foams as fire retardant and to reduce acidic corrosion of metals in contact with the foam.

U.K. Patent 901,663 (Lowe et al) indicated that fire resistant laminated plastics were comprised of fibrous materials and a resole resin in which the alkaline catalyst was neutralized with boric acid.

SUMMARY OF THE INVENTION

This invention relates to the composition and manufacture of a spray dried powder resin containing a low advanced resole resin. Specifically, a relatively low molecular weight liquid phenol-aldehyde resin is formulated, and manufactured, and then an oxo compound of boron is mixed into the resin prior to the spray drying process. Spray dryability of the low advanced resin is enhanced by the addition of the oxo boron compound.

The oxo boron compound is believed to form chelate complexes with the phenol-aldehyde resin molecules. The complex formation improves the spray dryability of the resin and reduces advancement, i.e., increase of molecular weight, of the resin during the spray drying process. Therefore, the spray dried resins have a low molecular weight and pre-cure resistance particularly that needed for waferboard/oriented strandboard manufacture.

The powder resin manufacture involves the following steps: (a) preparation of low molecular weight resole with phenol, aldehyde, and an alkaline catalyst; (b) mixing the boron compound with the resin such as the preparation of an aqueous solution of oxo boron compound and mixing the resin with the boron compound solution; and (c) spray drying the resin composition. Advantages of the invention include:

1. Spray dryability of low advanced phenol-aldehyde resin is substantially improved. During spray drying, little powder resin deposits on the wall of the dryer chamber and cyclone. Therefore, a consistent quality of powder resin is produced, powder resin yield is increased, and fire hazard in the spray dryer is reduced.

2. The spray dried resins have the desired thermal flow property and pre-cure resistance for waferboard/oriented strandboard manufacture.

3. Productivity of the spray dryer is improved by reducing plant shut down for cleaning.

4. Reduces oxidation of the phenol-aldehyde resin; therefore, a tan color formation of the powder resin during storage is reduced.

5. The powder resins have high thermal flow property and may also be used as molding compounds.

6. Waferboard and oriented strandboard made with the powdered resins of this invention have improved properties such as higher internal bond strength.

DETAILED DESCRIPTION

Three steps are involved in preparing the powdered resins of this invention. These steps are: (a) preparation of a low advanced phenol-aldehyde resin; (b) addition or mixing of a water soluble oxo boron compound into the aqueous resin; and (c) spray drying of the liquid resin containing the boron compound to form the powdered resin.

A. Preparation of the Phenol-Aldehyde Resin

The phenol-aldehyde low molecular weight resole resins of this invention are preferably made from phenol and formaldehyde with sodium hydroxide as the catalyst. The phenol may be partly substituted with xylenols, cresols, catechol, and the naturally occurring alkyl phenols, such as cresylic acids. The aldehyde can be formaldehyde or other aldehydes as is well known in the phenolic resole arts such as paraformaldehyde, acetaldehyde, and propionaldehyde. Sodium hydroxide is preferably used as the catalyst for formation of the resin, although other alkaline catalysts conventionally used to catalyze the formation of resoles such as other alkali metal hydroxides, allkaline earth hydroxides, and metal carbonates such as sodium or potassium carbonate may be used. The aqueous resole resin is preferably made in a two-stage process. For the first stage reaction in forming the resin, the molar ratios of phenol:aldehyde:alkaline catalyst are preferably 1:(1.4–1.6):(0-.1–.15) and, more broadly, 1:(1.2–1.8):(0.05–0.25). The first stage reaction temperature is from about 90° C. to reflux. The final molar ratios of phenol : aldehyde : alkaline catalyst are preferably 1:(1.8–2.2):(0.1–0.15) and, more broadly, 1:(1.5–2.5):(0.05–0.25). The desired resin molecular weight distribution is preferably manipulated by a two-stage aldehyde addition and two-level reaction temperatures. The first stage involves a higher temperature reaction which is favorable for the condensation reaction to build higher molecular weight resin. The second stage is a low temperature reaction which is favorable for the methylolation type of reaction between phenol and aldehyde.

The solid contents in the aqueous solution are 50 to 60% at the end of the first stage. The resin is condensed to a viscosity (25° C.) of Gardner Holdt preferably E to G, which is about 1100 to 1700 weight average molecular weight (Mw) by the gel permeation chromatography method for this first stage. At the end if the first stage, the resin contains residual free phenol and higher molecular weight resin. The reaction temperature is then cooled to 65° to 70° C. for the second stage reaction.

For the second stage reaction, the second portion of formaldehyde is added to the first stage reacted resin. The final molar ratios of formaldehyde to phenol are preferably 1.8 to 2.2:1. The second stage is preferably reacted at 60° to 70° C. until the free formaldehyde content is below 1 to 3% based on the liquid resin. The second stage reaction temperature can vary from about 55° C. to 70° C. Owing to low reaction temperatures, the second stage is mainly a methylolation reaction and the condensation reactions to form higher molecular weight resins are minimized.

It is preferable that an anionic surfactant at 0.2 to 0.4% based on the liquid resin is added to reduce surface tension of the liquid resin in order to obtain a desired fine particle size of the spray dried powder resin.

Advantageously, ammonia water, (such as that of 28 to 30% concentration) of 1.5 to 2.5% based on the liquid resin, is added to the resin to react with the residual free formaldehyde to form stable nitrogen compounds in the resin. The nitrogen compounds will contribute a desired yellowish color of the resin spots is close to the natural wood color of the waferboard/strandboard. The ammonia water may b*e substituted partially or completely with another nitrogen containing compound such as hexamethylenetetramine, dicyandiamide and melamine.

The resin, prior to spray drying, preferably contains 35 to 45% of low molecular weight resin based on the resin solids by weight of methlolated phenols and di-nuclear and tri-nuclear phenols. The range of the weight average molecular weight for this fraction is about 120 to 520 determined by gel permeation chromatography. This fraction of the resin significantly contributes to the thermal flow property of the spray dried resin. The overall weight average molecular weight for the liquid resin before spray drying is from about 1200 to 1800.

The liquid resins used in this invention will have a final viscosity of about 200 to 900 Cps at 25° C. and preferably 250 to 500 Cps at 25° C. and a resin solids content of about 40% to 50% based on the aqueous resin solution or dispersion before addition of the water soluble oxo boron compound. The term "resin solids" as used herein refers to non-volatile content of the liquid resin is determined by Test Method 2.2 of the West Coast Adhesives Manufacturers.

Depending on waferboard/oriented strandboard manufacturing conditions, the content of the low molecular weight resin fraction can be adjusted by the liquid resin manufacture technique. For example, to keep the final aldehyde to phenol molar ratio constant, the low molecular weight resin fraction can be increased by reducing the aldehyde to phenol molar ratio of the first stage reaction. Whereas, aldehyde to phenol molar ratios of the first stage reaction can be increased to reduce the content of the low molecular weight fraction.

B. Modification of the Phenol-Aldehyde Resin with Water Soluble Oxo Compounds of Boron The oxo boron compounds dissolve very slowly in the phenol-aldehyde resin at ambient temperature. Therefore, it is preferred that an aqueous solution of boron compound is first prepared and then mixed with the resin. Alternatively, the oxo boron compounds may be added to the resin during the second stage cook. Increasing the temperature of the resin can improve the solubility It requires only a small amount of the boron compound to significantly improve spray dryability of the resole resins and retard increase of molecular weight of the resin. The improvement of the spray dryability is initially proportional to the quantity of boron compound in the resin and then levels off. The quantity of boron compound in the resin for improving the spray drying and retarding increase of molecular weight can vary over a wide range such as that of about 0.05% to 5% or more of the boron compound on an anhydrous basis in relation to resin solids of the resole resin. The preferred contents of the boron compound on an anhydrous basis is from about 0.1% to 2% and particularly from about 0.5% to 1.5% based on the resin solids.

Any boron compound having the requisity solubility in water is suitable for use in this invention. The water soluble boron compounds are oxygen containing boron compounds, also referred to herein as oxo boron compounds. Additionally, insoluble boron compounds which are converted to oxygen-containing water soluble compounds in the phenol-aldehyde resin are also operable. Illustrative of suitable boron compounds there can be mentioned boric acid, metaboric acid, and the various borates and metaboric acid salts such as that of borax decahydrate ($Na_2B_4O_7.10H_2O$); borax pentahydrate ($Na_2B_4O_7.5H_2O$); potassium borates; lithium borates; ammonium borates; sodium metaborates; potassium metaborates; and ammonium metaborates. Boric acid and sodium borate are the preferred water soluble oxo compounds of boron.

C. The Spray Drying Process

In spray drying, the liquid feed of the boron containing phenol-aldehyde resin is converted to a fine spray; the water in the feed is evaporated by means of a stream of hot air; and the dry, powdered product is separated from the stream of hot air. Moisture evaporation is controlled by control of the inlet and outlet temperature of the hot air used for drying. Due to the thermosetting nature of the product, the inlet temperature of the hot air is generally from about 180° C. to 210° C. and preferably from almost 185° C. to 195° C. The outlet temperature is generally from about 60° C. to 95° C. and preferably from about 75° C. to 90° C. Preferably, the phenol-aldehyde resin supplied to the spray dryer will have a resin solids content of about 25% to 45% by weight of the aqueous resin solution and a viscosity of about 30 to 300 Cps at 25° C. This differs from the resin as prepared in the above section entitled "Preparation of Phenol-Aldehyde Resin" and is due primarily to the addition of water with the boron compound or simply the addition of water to dilute the resin for spray drying.

The particle size distribution, moisture content, and thermal flow of the spray dried resins are controlled by operations well known in the spray drying art by variables such as infeed resin solids content and surface tensions, speed of the rotary atomizer, feed rate, and the temperature differences of the inlet and outlet. Particle size distribution is an important factor in production of a powdered resin. This is particularly the case for waferboard/oriented strandboard applications. At a given resin add-on level, the smaller the powder resin particle size, the more areas of wood wafers or strands are covered with the resin. The preferred particle sizes for the waferboard/oriented strandboard applications are that 80 to 90% of the powder resin is less than 75 microns and 60 to 70% is less than 45 microns.

Moisture content of the spray dried resin affects the free flow property of the powder. Owing to the hygroscopic property of phenol-formaldehyde resin, the highly moist product tends to cake during storage. Therefore, the moisture contents should preferably be below 2 to 3%. To reduce the caking problem, drying agents, preferably calcium silicate and/or lime at 0.5 to 2.0% based on powder resin weight, may be mixed with the resin before bagging.

Thermal flow property of the powder resin depends mostly on the molecular weight of the resin. During the spray drying process, heat may increase the molecular weight. Therefore, the spray dryer should be operated at as low a temperature as possible.

The weight average molecular weight of the spray dried resin will vary from about 1250 to 1900 and preferably about 1300 to 1700.

D. Manufacture of the Boards

The waferboard or strandboard is manufactured by conventional techniques with use of the powdered resins of this invention instead of the prior art powdered phenol-aldehyde resins. Thus, heat and pressure are applied to a mat of wafers or oriented strands of wood coated with the boron-containing powdered resin of this invention in order to cure the resin and form the board. Conventional temperatures, time periods, pressures, and quantity of resin binder are used. Thus, the temperature can vary from about 195° C. to 220° C., the pressure can vary from about 450 to 700 psi, and the quantity of powdered resin coating the wafers or strands can vary from about 1.5 to 5% based on the weight of the wafers or strands.

The following examples illustrate the invention.

EXAMPLE 1

This example shows the preparation of a low advanced phenol-formaldehyde resin and the improvement of the spray dryability of the resin by treating the liquid resin with borax pentahydrate prior to spray drying. The powder resin made from spray drying the resin is pre-cure resistant for waferboard/oriented strandboard manufacture.

A resin reactor was charged with the following ingredients:

| Ingredients | Parts by Weight | Molar Ratio |
|---|---|---|
| Phenol (92.0% conc.) | 33.83 | 1 |
| First Fromaldehyde (46.5% conc.) | 32.04 | 1.5 |
| First Water | 10.48 | |
| Sodium Hydroxide (50% conc.) | 3.48 | 0.13 |
| | (79.83) | |
| Second Fromaldehyde (46.5% conc.) | 12.81 | 0.6 |
| Second Water | 2.75 | |
| Third Formaldehyde (46.5% conc.) | 2.10 | 0.1 |
| Ammonium Hydroxide (28% conc.) | 2.19 | |
| Oleic Acid | 0.32 | |
| | (20.17) | |

The reactor was charged with phenol, first formaldehyde, and first water. Then the sodium hydroxide was added slowly over a 10 to 15 minute period and the temperature was allowed to rise to 95° C. in 50 minutes. The resin was reacted at 95° C. to a Gardner-Holdt viscosity (25° C.) of E to F, then cooled to 75° C. to 70° C. over 10 to 15 minutes. Then the second formaldehyde and the second water were added and the temperature was adjusted to 70° C. The resin was reacted at 70° C. to a viscosity (25° C.) of G to H, then cooled to 55° to 50° C. The third formaldehyde and ammonium hydroxide solution were added. The reaction was continued at 60° C. to a viscosity (25° C.) of L to M. Then the resin was cooled to below 25° C. The resin properties were as follows:

| | |
|---|---|
| Viscosity (25° C.) | LL-M (Gardner-Holdt) |
| Solids Content | 47.0% |
| Refractive Index (25° C.) | 1.4683 |
| Water Dilutability (25° C.) | 198% |

The resin was further treated with borax pentahydrate prior to spray drying as follows:

| | Parts By Weight | | |
|---|---|---|---|
| Ingredient | Control | Resin A | Resin B |
| Borax Pentahydrate ($Na_2B_7O_4.5H_2O$) | 0 | 0.2 | 0.3 |
| Water | 36.1 | 36.1 | 36.4 |
| Liquid Resin (47.0% solids) | 63.9 | 63.7 | 63.3 |

The Resin A and Resin B were prepared by dissolving the borax pentahydrate in the water and then mixing with the liquid resin. The control was the resin sample without the borax treatment. The properties of the resins were as follows:

| | Control | Resin A | Resin B |
|---|---|---|---|
| Resin Solids Content | 30.0% | 30.1% | 30.1% |
| Refractive Index (25° C.) | 1.4139 | 1.4144 | 1.4163 |
| Viscosity (25° C.) (Gardner-Holdt) | A1 | A1 | A1-AA |

The effect of the borax treatments on the resin spray dryability was evaluated by comparing the spray dryability of Resin A and Resin B with the Control. The resins were spray dried with a laboratorjy spray dryer—Buchi/Brinkmann Mini Spray Dryer Model 190 of Brinkmann Instruments Co. The inlet temperature was 185° C. The spray dryer was operated so that the outlet temperatures were 80° to 90° C. During the spray dring operation, the chamber was brushed manually to simulate an air broom of a commercial production plant.

The spray dryability of the resin was determined by the powder resin yield based on the theoretical resin solids input to the spray dryer. The results of the spray dryability test are shown in Table 1:

TABLE 1

| Resin No. | Powder Resin Yield |
|---|---|
| Control | 41.8% |
| Resin A | 88.8% |
| Resin B | 92.6% |

The results in Table 1 indicate that Resin A and Resin B, which were both treated with borax pentahydrate, show significantly higher powder resin yield than the control sample. During spray drying the control resin, a substantial amount of the powder resin was deposited on the surfaces of the spray dryer chamber and cyclone. The deposited powder resin was too soft and sticky to be brushed off during the spray drying. Therefore, the results demonstrate that the spray dryability of the low advanced phenol-formaldehyde resin (Control) can be enhanced by the borax treatments.

The powder resins were further compounded with drying agents—1% calcium hydroxide and 0.1% calcium silicate based on weight of the powder resin.

ANALYSES OF POWDER RESINS OF EXAMPLE 1

The powder resins compounded with drying agents were analyzed for non-volatile content, bulk density, thermal flow property, molecular weights, and particle size distribution. For determining the non-volatile content, a 0.5+/−0.05 grams powder resin sample was dried in a 125° C. oven for 105 minutes. The non-volatile is the percent of the dried resin based on the original sample weight. For determination of thermal flow property, a 12.7 mm (0.5") diameter resin pellet was made by pressing 0.5+/−0.05 grams powder sample with a Parr pellet press. The resin pellet was then pressed on a 150 +/−1° C. hot plate under 6 Kg weight pressure for 3.0 minutes. The average radius of the flattened pellet was measured.

Molecular weight distributions of the powder resins were determined by a high pressure gel permeation chromatograph. The equipment is a model ALC/GPC-201 with $10^4A°$, $10^3A°$, 500A°, and 100A° μ-styragel columns combination from Waters Associates, Inc.

Resin sample for the gel permeation chromatograph was prepared by dissolving the powder resin in tetrahydrofuran solvent at about 0.3% concentration, then acidifying to pH 4 to 5 with one normal sulfuric acid and dehydrating with anhydrous sodium sulfate. Further, the resin solution was filtered using a sample clarification kit.

The gel permeation chromatograph was operated by the following conditions:

| | |
|---|---|
| Solvent | Tetrahydrofuran |
| Temperature | 25° C. |
| Detector | Refractive Index |
| Flow Rate | 1.0 ml/min. |

The molecular weight of the resin was determined by using a calibration from reference polystyrenes, bisphenol A and phenol. Weight average (Mw) and number average (Mn) molecular weights were determined from the chromatograms. All molecular weights set forth in this application were determined by this same method. For the particle size distribution determination of the powdered resins, a 30 gram resin sample was shaken through a Tyler sieve set comprised of 100, 200, and 325 mesh for 15 minutes. The powder resins retained on each sieve and pan were determined based on the total powder resin weight.

The results of the powder resin samples, Control, Resin A, and Resin B, are shown in Table 2:

TABLE 2

| Powder Resin Property | Control | Resin A | Resin B |
|---|---|---|---|
| Non-volatile Content, % | 90.1 | 91.9 | 92.6 |

TABLE 2-continued

| Powder Resin Property | Control | Resin A | Resin B |
|---|---|---|---|
| Bulk Density, g/cm$^3$ | 0.453 | 0.449 | 0.412 |
| Radial Thermal Flow, mm | 25.3 | 22.3 | 22.0 |
| Average Molecular Weight | | | |
| Weight Average (Mw) | 1630 | 1506 | 1561 |
| Number Average (Mn) | 531 | 525 | 508 |
| Dispersity (Mw/Mn) | 3.1 | 2.9 | 3.1 |
| Powder Paricle Size Distribution | | | |
| >100 mesh (>150 μm) | 3.5 | 0.8 | 0.6 |
| <100 >200 mesh (<150 >75 μm) | 11.0 | 3.2 | 3.7 |
| <200 >325 mesh (<75 >45 μm) | 13.8 | 6.7 | 5.7 |
| <325 mesh (<45 μm) | 71.7 | 89.3 | 90.0 |

The results in Table 2 show that the borax treated Resin A and Resin B had lower molecular weights than the Control sample, although their radial thermal flows were lower than the Control. This indicated that the borax treated Resin A and Resin b reduced the resin advancement during the spray drying process. Also, the particle sizes of Resin A and Resin B were finer than the Control.

EXAMPLE 2

This example is to evaluate three powder resins—the Control, Resin A, and Resin B—for making homogeneous waferboards. The waferboards were tested for internal bond and 2-hour boiled (accelerated aging) modulus of rupture (MOR). The Canadian Standards Association (CSA) standard CAN3-0437.1-M85 was followed.

Laboratory size (254×254×11.1 mm) waferboards were made at conditions similar to conventional production at a waferboard mill. Commercial aspen wood wafer furnish which contained 3.5% moisture content was first sprayed with 1.5% molten slack wax and then blended with 2.3% powder resin based on dry wood weight.

The wax and resin treated wood furnish was formed into a mat and prepressed in a cold press. In simulating the broad waferboard production conditions, the mats were subjected to a pre-cure test before hot pressing. For the pre-cure test, a 3.2 mm thick stainless steel caul plate was preheated to 120° C., 130° C., 140° C., and 25° C. as the control caul temperature. Then the prepressed mat was placed on the preheated caul plate for 10 minutes prior to hot-pressing. To ensure good contact between mat and the preheated caul plate, a caul plate which gave a pressure of 4.5 g/cm$^2$ on the mat was placed on top of the mat. After the pre-cure test, the 11.1 mm thick waferboard was then made by hot pressing at 210° C. press temperature for 4.5 minutes with a maximum pressure of 35.2 Kg/cm$^2$ (500 psi). The target board density was 0.65 g/cm$^3$.

Four (4) boards with 4 different caul temperatures pre-treatments were made from each powder resin. Six (6) internal bond samples and one 2-hour boiled MOR sample were cut from each board and tested according to the CSA standard CAN3-0437.1-M85. The rate of face failure (%) was determined from the ratio of the number of face failure (breaks) samples to the total internal bond tested specimens. The rate of face failure indicates the pre-cure resistance of the powder resin. The results are shown in Table 3.

TABLE 3

| Caul. Temp. C. | Board Density g/cm$^3$ | Internal Bond[a] MPa* | Face Failure[b] % | 2-hr. Boiled MOR MPa |
|---|---|---|---|---|
| Resin: Control | | | | |
| 25 | 0.65 | 0.459 | 0 | 14.8 |
| 120 | 0.65 | 0.472 | 0 | 10.7 |
| 130 | 0.65 | 0.415 | 33 | 10.7 |
| 140 | 0.65 | 0.420 | 33 | 10.7 |
| Average | 0.65 | 0.442 | | 11.7 |
| Resin A | | | | |
| 25 | 0.67 | 0.506 | 0 | 12.8 |
| 120 | 0.64 | 0.462 | 0 | 12.6 |
| 130 | 0.67 | 0.443 | 17 | 14.6 |
| 140 | 0.64 | 0.537 | 0 | 11.2 |
| Average | 0.66 | 0.487 | | 12.8 |
| Resin B | | | | |
| 25 | 0.66 | 0.508 | 0 | 16.9 |
| 120 | 0.67 | 0.523 | 0 | 17.0 |
| 130 | 0.68 | 0.456 | 0 | 13.0 |
| 140 | 0.65 | 0.456 | 17 | 14.0 |
| Average | 0.67 | 0.486 | | 15.3 |
| CAN3-0437.0-M85 Requirements | | 0.345 | | 8.6 |

[a]Average of six specimens.
[b]Ratio of face failure specimens to the total internal bond tested specimens.
*Mega Pascals The results shown in Table 3 indicate that the borax modified resins, Resin A and Resin B, as well as the Control Powder Resin, were pre-cure resistant for waferboard manufacture, and the resins satisfied the wide range of caul plate temperatures present in commercial production lines. The properties of waferboards made with the powder resins passed the CSA standard.

EXAMPLE 3

The liquid phenol-formaldehyde resin made in Example 1 was further treated with different amounts of borax pentahydrate and tested for spray dryability.

| Ingredient | Parts By Weight | |
|---|---|---|
| | Resin C | Resin D |
| Borax Pentahydrate (Na$_2$B$_4$O$_7$.5H$_2$O) | 0.1 | 0.4 |
| Water | 36.2 | 36.1 |
| Liquid Resin (47.0% solids) | 63.7 | 63.5 |

The borax pentahydrate was first dissolved in the water and mixed with the liquid resin. The borax modified liquid resins had the following properties:

| | Resin C | Resin D |
|---|---|---|
| Resin Solids Content, % | 30.0 | 30.3 |
| Refractive Index (25° C.) | 1.4137 | 1.4141 |
| Viscosity (25° C.) (Gardner-Holdt) | A1A1-A | A |

Resin C and Resin D were spray dried as described in Example 1. The power resin yields are shown in Table 4.

TABLE 4

| Resin | Powder Resin Yield |
|---|---|
| Resin C | 74.2% |
| Resin D | 84.5% |

Without borax treatment, the powder resin yield was only 41.8% (Example 1); therefore, the results shown in Table 4 indicate that the borax treatments (Resin C and Resin D) significantly improved the powder resin yields.

Powder Resin C and Resin D were further compounded with 1% calcium hydroxide and 0.1% calcium silicate based on the weight of powder resin. The powder resins were then tested for non-volatile content, bulk density, thermal flow property, and particle size distribution. The results are shown in Table 5.

TABLE 5

| Powder Resin Property | Resin C | Resin D |
|---|---|---|
| Non-volatile Content, % | 91.3 | 91.5 |
| Bulk Density, g/cm$^3$ | 0.38 | — |
| Radial Thermal Flow, mm | 23.0 | 22.0 |
| Particle Size Distribution | | |
| >100 mesh (>150 μm) | 1.0 | 1.0 |
| <100 >200 mesh (<150 >75 μm) | 5.7 | 3.5 |
| <200 >325 mesh (<75 >45 μm) | 8.3 | 8.2 |
| <325 mesh (<45 μm) | 85.0 | 87.3 |

EXAMPLE 4

This example showed that boric acid (H$_3$BO$_3$) improved spray dryability of a phenol-formaldehyde resin. The liquid phenolic resin made in Example 1 was treated with different amounts of boric acid as follows:

| | Parts by Weight | |
|---|---|---|
| Ingredient | Resin E | Resin F |
| Boric Acid (H$_3$BO$_3$) | 0.1 | 0.3 |
| Water | 36.2 | 36.4 |
| Liquid Resin (47.0% solids) | 63.7 | 63.3 |

The boric acid was dissolved in the water, then mixed with the liquid phenol-formaldehyde resin. The properties of the boric acid treated liquid resin were as follows:

| | Resin E | Resin F |
|---|---|---|
| Resin Solids Content, % | 30.0 | 30.1 |
| Refractive Index (25° C.) | 1.4144 | 1.4145 |
| Viscosity (25° C.)(Gardner-Holdt) | A1A1-A | A |

The resins were spray dried as described in Example 1, and the powder resin yields are shown in Table 6:

TABLE 6

| Resin | Powder Resin Yield |
|---|---|
| Resin E | 74.5% |
| Resin F | 91.0% |

A powder resin yield from spray drying a control sample, without boric acid treatment, was only 41.8%. Therefore, the results shown in Table 6 indicate that the boric acid treatments significantly improved spray dryability of the liquid resin.

The spray dried powder resins were further compounded with 1% calcium hydroxide and 0.1% calcium silicate, based on weight of the powder resin, and then tested for non-volatile content, bulk density, thermal flow property, and particle size distribution. The results are shown in Table 7:

TABLE 7

| Powder Resin Properties | Resin E | Resin F |
|---|---|---|
| Non-volatile Content, % | 92.0 | 92.6 |
| Bulk Density, g/cm$^3$ | 0.41 | 0.38 |
| Radial Thermal Flow, mm | 23.8 | 21.8 |
| Particle Size Distribution | | |
| >100 mesh (>150 μm) | 1.7 | 1.0 |
| <100 >200 mesh (<150 >75 μm) | 7.3 | 4.0 |
| <200 >325 mesh (<75 >45 μm) | 10.0 | 5.7 |
| <325 mesh (<45 μm) | 81.0 | 89.3 |

EXAMPLE 5

A low advanced phenol-formaldehyde liquid resin was prepared, further treated with sodium borate, and tested for spray dryability.

A resin reactor was charged with the following ingredients:

| Ingredients | Parts by Weight | Molar Ratio |
|---|---|---|
| Phenol (92% conc.) | 33.93 | 1 |
| First Formaldehyde (46.5% conc.) | 32.14 | 1.5 |
| First Water | 10.51 | |
| Sodium Hydroxide (50% conc.) | 3.18 (79.76) | 0.12 |
| Second Formaldehyde (46.5% conc.) | 12.85 | 0.6 |
| Second Water | 2.76 | |
| Third Formaldehyde (46.5% conc.) | 2.11 | 0.1 |
| Ammonium Hydroxide (28% conc.) | 2.20 | |
| Oleic Acid | 0.32 (20.24) | |

The reactor was charged with phenol, first formaldehyde, and first water. Then the sodium hydroxide was added slowly over a 10 to 15 minute period, and the temperature was allowed to rise to 95° C. in 50 minutes. The temperature was held at 95° C. until E to F of the Gardner-Holdt viscosity (25° C.), then cooled to 75° to 70° C. The second formaldehyde and second water were added to the resin, and the temperature was adjusted to 70° C. The reaction was continued at 70° C. until the Gardner-Holdt viscosity (25° C.) was G to H. The temperature was reduced to below 55° C., then the third formaldehyde, ammonium hydroxide solution, and oleic acid were added. Cooling was continued to below 25° C.

The properties of the liquid resin are as follows:

| Viscosity (25° C.) | J-KK |
|---|---|
| Solids Content | 47.0% |
| Refractive Index (25° C.) | 1.4675 |
| Water Dilutability (25° C.) | 167% |

The liquid resin was treated with different amounts of borax pentahydrate as follows:

| | Parts By Weight | | | |
|---|---|---|---|---|
| Ingredient | Control | Resin G | Resin H | Resin I |
| Borax pentahydrate (Na$_2$B$_4$O$_7$.5H$_2$O) | 0 | 0.2 | 0.4 | 1.0 |
| Water | 36.2 | 36.1 | 34.2 | 35.8 |
| Liquid Resin (47.0% solids) | 63.8 | 63.7 | 65.4 | 63.2 |

The borax pentahydrate was first dissolved in the water and then mixed with the resin. The Control sample had no borax treatment. Properties of the Control and the borax treated resins are shown as follows:

|  | Control | Resin G | Resin H | Resin I |
|---|---|---|---|---|
| Resin Solids Content, % | 30.0 | 30.1 | 30.2 | 30.7 |
| Refractive Index (25° C.) | 1.4135 | 1.4132 | 1.4161 | 1.4140 |
| Viscosity (25° C.) | A1A1-A | A1A | AB | EF |

The liquid resins were spray dried as described in Example 1. The powder resin yields are shown in Table 8:

TABLE 8

|  | Control | Resin G | Resin H | Resin I |
|---|---|---|---|---|
| Powder Resin Yield, % | 43.0 | 74.5 | 88.0 | 91.7 |

Again, the results in Table 8 indicate that the borax treated resins, Resin G, Resin H, and Resin I, significantly enhance the powder resin yield from the Control sample.

The powder resins were further compounded with 1% calcium hydroxide and 0.1% calcium silicate based on the weight of the powder resin and tested for non-volatile content, bulk density, thermal flow property, average molecular weight, and particle size distribution. The results are shown in Table 9:

TABLE 9

| Powder Resin Property | Control | Resin G | Resin H | Resin I |
|---|---|---|---|---|
| Non-volatile Content, % | 91.3 | 92.2 | 91.7 | 91.5 |
| Bulk Density, g/cm$^3$ | — | 0.40 | 0.44 | 0.47 |
| Radial Thermal Flow, mm | 26.5 | 24.5 | 22.5 | 18.5 |
| Average Molecular Weight |  |  |  |  |
| Weight Average (Mw) | 1458 |  |  | 1323 |
| Number Average (Mn) | 507 |  |  | 456 |
| Dispersity (Mw/Mn) | 2.9 |  |  | 2.9 |
| Particle Size Distribution |  |  |  |  |
| >100 mesh (>150 μm) | 13.9 | 1.7 | 1.5 | 1.7 |
| <100 >200 mesh (<150 >75 μm) | 21.7 | 8.0 | 4.8 | 7.2 |
| <200 >325 mesh (<75 >45 μm) | 25.2 | 13.3 | 7.0 | 10.8 |
| <325 mesh (<45 μm) | 39.2 | 77.0 | 86.7 | 80.3 |

The results in Table 9 indicate that the borax treated resins, Resin G, Resin H, and Resin I, had lower radial thermal flow and smaller particle size than the Control powder resin. Although the radial thermal flow of Resin I is substantially smaller than the Control, the average molecular weight of the borax treated Resin I is lower than the Control. Again, this demonstrated that the borax treatment protected the Resin from advancement during the spray drying process.

EXAMPLE 6

This example demonstrates that spray dryability of the liquid phenol-formaldehyde resin prepared in Example 5 was improved by boric acid treatments.

The resins treated with differnt amounts of boric acid are shown as follows:

|  | Parts By Weight | |
|---|---|---|
| Ingredient | Resin J | Resin K |
| Boric Acid (H$_3$BO$_3$) | 0.3 | 0.6 |
| Water | 36.4 | 36.3 |
| Resin (47.0% solids) | 63.3 | 63.1 |

The boric acid was first dissolved in the water, then mixed with the phenol-formaldehyde resin. The properties of the boric acid treated resin are as follows:

|  | Resin J | Resin K |
|---|---|---|
| Resin Solids Content, % | 30.1 | 30.3 |
| Refractive Index (25° C.) | 1.4128 | 1.4131 |
| Viscosity (25° C.) | A | DD-E |

The resins were spray dried as described in Example 1. The powder resin yields based on the resin solids input to the spray dryer are shown in Table 10.

TABLE 10

| Resin No. | Resin J | Resin K |
|---|---|---|
| Powder Resin Yield, % | 66.3 | 75.3 |

As shown in Table 10, the powder resin yields from the boric acid treated resins, Resin J and Resin K, improved from the Control sample shown in Example 5. The Control sample, without boric acid treatment, had a powder resin yield of only 43%.

The powder resins were further compounded with 1% calcium hydroxide and 0.1% calcium silicate based on the weight of the powder resin; the resins were then tested for non-volatile content, bulk density, thermal flow property, and particle size distribution. The results are shown in Table 11.

TABLE 11

| Powder Resin Property | Resin J | Resin K |
|---|---|---|
| Non-Volatile Content, % | 92.5 | 91.5 |
| Bulk Density, g/cm$^3$ | 0.352 | 0.407 |
| Radial Thermal Flow, mm | 23.0 | 23.5 |
| Particle Size Distribution |  |  |
| >100 mesh (>150 μm) | 3.0 | 2.3 |
| <100 >200 mesh (<150 >75 μm) | 10.2 | 10.2 |
| <200 >325 (<75 >45 μm) | 15.2 | 11.2 |
| <325 mesh (<45 μm) | 71.6 | 76.3 |

EXAMPLE 7

The example is to test powder Resin G and Resin I from Example 5 and Resin K from Example 6 for waferboard manufacture. The waferboards were tested for internal bond and 2-hour boiled (accelerated aging) modulus of rupture (MOR). Canadian Standard CAN3-0437.1-M85 was followed.

Laboratory size (254×254×11.1 mm) waferboards were made at conditions similar to a conventional waferboard production line. Commercial aspen wood wafer furnish of 4.5% moisture content was first sprayed with 1.5% molten slack wax and then blended with 2.3% powder resin based on the dry wood weight.

The wax and powder resin treated wood furnish was formed into a mat and prepressed in a cold press. To simulate wide waferboard manufacturing conditions, the mat was subjected to a pre-cure test before hot pressing. For the pre-curing test, 3.2 mm thick stainless steel caul plates were pre-heated to the temperatures of 120° C., 130° C., and 140° C. A control caul temperature was 25° C. The prepared mats were placed on the preheated caul plate for 10 minutes prior to hot pressing. To ensure good contact between mat and the hot caul plate, a caul plate which gave a pressure of 4.5 g/cm² on mat was placed on top of the mat. Then the 11.1 mm thick waferboard was made by hot pressing at 210° C. press temperature for 4.5 minutes with a maximum pressure of 35.2 Kg/cm² (500 psi). The target board density was 0.65 g/cm³.

Four (4) boards with 4 caul temperatures of pre-cure test were made from each powder resin. Six (6) internal bond samples and one 2-hour boiled MOR sample were prepared from each panel and tested according to CAN3-0437.1-M85. The rate of face failure (%) was determined from the ratio of the number of face failure (breaks) samples to the total internal bond tested specimens. The rate of face failure indicates pre-cure resistance of the powder resin. The results are shown in Table 12.

TABLE 12

| Caul Temp. °C. | Board Density g/cm³ | Internal Bond[a] MPa* | Face Failure[b] % | 2-hour Boiled MOR MPa |
|---|---|---|---|---|
| Resin G (from Example 5) | | | | |
| 25 | 0.67 | 0.556 | 0 | 15.2 |
| 120 | 0.75 | 0.552 | 0 | 17.4 |
| 130 | 0.74 | 0.512 | 17 | 19.6 |
| 140 | 0.66 | 0.491 | 0 | 14.6 |
| Average | 0.69 | 0.533 | | 15.7 |
| Resin I (from Example 5) | | | | |
| 25 | 0.66 | 0.438 | 0 | 13.9 |
| 120 | 0.69 | 0.570 | 0 | 17.0 |
| 130 | 0.74 | 0.512 | 17 | 19.6 |
| 140 | 0.68 | 0.493 | 17 | 11.8 |
| Average | 0.69 | 0.503 | | 15.6 |
| Resin K (from Example 6) | | | | |
| 25 | 0.70 | 0.469 | 0 | 14.6 |
| 120 | 0.70 | 0.498 | 0 | 19.5 |
| 130 | 0.73 | 0.502 | 0 | 13.9 |
| 140 | 0.69 | 0.473 | 33 | 16.2 |
| Average | 0.71 | 0.486 | | 16.1 |
| CAN3-0437.0-M85 Requirements | | 0.345 | | 8.6 |

[a] Average of six specimens
[b] Ratio of face failure specimen to the total internal bond tested specimen.
*Mega Pascals The results in Table 12 indicate that borax treated Resin G and Resin I, as well as boric acid treated Resin K, were pre-cure resistant for waferboard manufacture, and the powder resins satisfied the wide range of caul plate temperatures present in commercial production lines. Morever, the waferboard properties made with the powder resins surpassed the CSA standard.

What I claim is:

1. A method for preparing a curable phenol-aldehyde spray dried powder which comprises spray drying an aqueous phenol-aldehyde resole resin containing from about 0.05% to 5% by weight of a water soluble oxo boron compound, the quantity of said boron compound being on an anhydrous basis in relation to the resin solids of said resole.

2. The method of claim 1 wherein the aldehyde is formaldehyde, acetaldehyde, paraformaldehyde, or propionaldehyde.

3. The method of claim 1 wherein 35 to 45% by weight of the resin has a weight average molecular weight of about 120 to 520.

4. The method of claim 1 wherein the boron compound is selected from the group consisting of boric acid, sodium borates, potassium borates, lithium borates, ammonium borates, metaboric acid, sodium metaborates, potassium metaborates, lithium metaborates, and ammonium metaborates.

5. A method for preparing a curable phenol-formaldehyde spray dried powder which comprises spray drying an aqueous solution of a phenol-formaldehyde resole having a resin solids content of from about 25% to 45% by weight of the aqueous solution and a viscosity of about 30 to 300 Cps at 25° C., said resole containing from about 0.05% to 5% by weight of a water soluble oxo boron compound, the quantity of said boron compound being on an anhydrous basis in relation to the resin solids of said resole.

6. A method for preparing a curable phenol-formaldehyde spray dried powder which comprises spray drying at a spray dried inlet temperature of about 180° C. to 210° C. and an outlet temperature of about 60° C. to 95° C., an aqueous solution of a phenol-formaldehyde resole resin, said resin prepared by reacting about 1.5 to 2.5 moles of formaldehyde for each mole of phenol in the presence of about 0.05 to 0.25 moles of an alkaline catalyst to prepare an initial aqueous solution of a phenol-formaldehyde resole resin, admixing into said initial solution from about 0.05% to about 5% by weight of a water soluble oxo boron compound, the quantity of said boron compound being on an anhydrous basis in relation to the resin solids and adding additional water to the initial solution to form a less concentrated solution suitable for spray dying.

7. The method of claim 6 wherein the quantity of the boron compound varies from about 0.1% to 2%.

8. The method of claim 6 wherein the oxo boron compound is selected from the group consisting of boric acid, sodium borates, potassium borates, lithium borates, ammonium borates, metaboric acid, sodium metaborates, potassium metaborates, lithium metaborates, and ammonium metaborates.

9. The method of claim 6 wherein the resin is made in a two-stage reaction wherein for the first stage the molar ratios of phenol to formaldehyde to alkali catalyst are 1:(1.4–1.6):(0.1–0.15), and the reaction temperature varies from about 90° C. to reflux and formaldehyde is then added thereto so that at the end of the second stage the molar ratios of phenol to formaldehyde to alkali catalyst are 1:(1.8–2.2):(0.1–0.15) and wherein the reaction temperature during the second stage is from about 55° C. to 70° C.

10. The method of claim 6 wherein the aqueous resole resin solution contains from about 40% to about 55% by weight of resin solids and the viscosity varies from about 200 Cps to 900 Cps at 25° C. prior to admixing of the boron compound and addition of water for the spray drying step.

11. The method of claim 6 wherein 35% to 45% by weight of the resin solids has a weight average molecular weight of about 120 to 520.

12. A method for improving the spray drying of an aqueous phenol-formaldehyde resole resin solution wherein said resin has a weight average molecular weight of from about 1200 to 1800 to form a curable spray dried resin which comprises spray dyring said aqueous resin solution having dissolved therein from about 0.1 percent to 2 per cent of a water soluble oxo boron compound, the quantity of said boron compound being on an anhydrous basis in relation to the resin solids of said resole.

* * * * *